United States Patent
Butera

(10) Patent No.: US 7,320,470 B1
(45) Date of Patent: Jan. 22, 2008

(54) WHEELED CART FOR BEACH FISHERMAN HAVING STABILIZING ELEMENT

(76) Inventor: Emanuel C. Butera, 5 Sutphin Pines, Yardley, PA (US) 19067

( * ) Notice: Subject to any disclaimer, the term of this patent is extended or adjusted under 35 U.S.C. 154(b) by 53 days.

(21) Appl. No.: 11/187,212

(22) Filed: Jul. 25, 2005

(51) Int. Cl.
B62B 1/00 (2006.01)

(52) U.S. Cl. .................... 280/47.18; 280/47.29
(58) Field of Classification Search ............ 280/47.18, 280/47.24, 47.26, 646, 655
See application file for complete search history.

(56) References Cited

U.S. PATENT DOCUMENTS

| 3,804,432 | A | * | 4/1974 | Lehrman ................... 280/654 |
| 3,997,181 | A | * | 12/1976 | Jaco et al. ................ 280/47.19 |
| 4,355,818 | A | * | 10/1982 | Watts ...................... 280/654 |
| 4,429,897 | A | * | 2/1984 | Friedman et al. .......... 280/646 |
| 4,749,209 | A | * | 6/1988 | Edmonds .................... 280/652 |
| 5,203,815 | A | * | 4/1993 | Miller ...................... 43/21.2 |
| 5,333,885 | A | | 8/1994 | Pullman ................... 280/47.19 |
| 5,340,135 | A | | 8/1994 | Womberly ................ 280/47.19 |
| 5,713,583 | A | | 2/1998 | Hansen .................... 280/47.19 |
| 6,082,757 | A | | 7/2000 | Lin ........................... 280/654 |
| 6,113,129 | A | | 9/2000 | Marques et al. ............ 280/654 |
| 6,158,749 | A | * | 12/2000 | Roudebush ............... 280/47.16 |
| 6,398,235 | B1 | * | 6/2002 | Cary ........................ 280/47.26 |
| 6,874,798 | B2 | * | 4/2005 | Kang ....................... 280/47.18 |
| 6,883,267 | B1 | * | 4/2005 | Pruitt ....................... 43/54.1 |
| 6,962,354 | B1 | * | 11/2005 | Miller ...................... 280/47.26 |

* cited by examiner

Primary Examiner—Christopher Bottorff
(74) Attorney, Agent, or Firm—LaMorte & Associates

(57) ABSTRACT

A beach cart for carrying equipment along a beach. The beach cart has a frame and two wheels that support the frame. This allows the beach cart to roll freely along a beach. The beach cart has at least one fishing pole tube coupled to the frame so that the frame can hold fishing poles during fishing. Since the frame is supported upon two wheels, it is unstable. A stabilizing leg is therefore provided that has is coupled to the frame at a pivot connection. The stabilizing leg can be selectively rotated about the pivot connection between a raised position and a lowered position. The stabilizing leg and the two wheels combine to form a tripod support for the frame when the stabilizing leg is in its lowered position. The beach cart can therefore be made highly stable when unattended.

14 Claims, 4 Drawing Sheets

WHEELED CART FOR BEACH FISHERMAN HAVING STABILIZING ELEMENT

BACKGROUND OF THE INVENTION

1. Field of the Invention

In general, the present invention relates to wheeled carts that help a fisherman manually transport fishing equipment to and from the beach. More particularly, the present invention relates to the structure and specialized features of such wheeled carts.

2. Prior Art Description

People have fished along the shores of beaches for many thousands of years. During this long period of time, countless pieces of equipment have been designed to help fisherman transport equipment to and from the waterfront.

In industrialized countries, people who fish from the beach are, for the most part, leisure fishers who fish for their own enjoyment. The equipment used by such leisure fishermen include fishing poles, bait containers, tackle boxes, chairs, fishing pole stands and a variety of coolers and containers for holding food, drink and caught fish.

In very few places are fishermen allowed to drive vehicles directly to the waterfront of a beach. Rather, leisure fishermen are commonly required to carry their fishing gear a substantial distance from a vehicle parking lot to the water, across the width of a sandy beach.

The equipment used by leisure fishermen is usually too numerous and bulky to be carried by hand in a single trip. Consequently, a fisherman must either make multiple trips to hand carry the equipment or employ the use of some type of cart to help carry the equipment.

The prior art is replete with various types of carts that are intended to carry equipment along the sandy or stony ground of a beach. Many of these prior art carts contain features specifically design for use by leisure fisherman. For instance, in U.S. Pat. No. 5,333,885 to Pullman, entitled Fishing Cart Apparatus, a beach cart is shown that has features for holding fishing poles and other common fishing equipment. Similar prior art beach carts are exemplified by U.S. Pat. No. 6,082,757, to Lin, entitled Folding Collapsible Fishing Cart; and U.S. Pat. No. 5,340,135 to Womberly, entitled Hand Truck For Fishing Equipment.

Prior art fishing carts are often made to be as small and light as possible in order to be easily transportable. They also typically have wheels that enable the carts to be rolled to the waterfront across the width of a beach. A problem associated with such prior art portable fishing carts is that they typically hold equipment by stacking that equipment vertically. This causes the wheeled cart to have a high center of gravity, both when loaded and when unloaded. Accordingly, although such prior art fishing carts may be useful in transporting fishing poles to a beach, these same carts cannot be used to hold the fishing poles while fishing at the beach. Otherwise, if a strong wind is blowing along the beach, or if a fish pulls on a line, the cart holding the fishing pole can topple over.

Recognizing the tendency of portable beach carts to tip over, attempts have been made to make the beach carts more stable. Some prior art beach carts have augers that can be anchored into the sand at the beach, thereby holding the beach cart in a fixed, stable position. Such beach carts are exemplified by U.S. Pat. No. 6,113,129 to Marques, entitled Wheeled Beach Cart Construction. Of course, by anchoring a beach cart to the sand, the beach cart cannot be easily moved. This makes it difficult to change the position of the beach cart as the waterline at the beach ebbs and flows with the tide.

A more practical approach being used to make beach carts more stable is to design the beach cart to hold equipment in horizontal alignment rather than a vertical alignment. Such prior art beach carts are short and wide, having a low center of gravity. This makes the beach cart very stable, both when loaded with equipment and when unloaded. Such prior art beach carts are exemplified by U.S. Pat. No. 5,713,583 to Hansen, entitled Utility Cart For Concrete Fishing Operations. However, the broad, squat construction of such beach carts tends to make such beach carts very wide and bulky. It is therefore very difficult to store and transport such beach carts when they are not in use.

A need therefore exists for a beach cart that carries a large amount of equipment, yet is small, highly portable and very stable. This need is met by the present invention as described and claimed below.

SUMMARY OF THE INVENTION

The present invention is a beach cart for carrying equipment along a beach. The beach cart has a frame and two wheels that support the frame. This allows the beach cart to roll freely along a beach. The beach cart has at least one fishing pole tube coupled to the frame so that the frame can hold fishing poles during fishing. Since the frame is supported upon two wheels, it is unstable. A stabilizing leg is therefore provided that has is coupled to the frame at a pivot connection. The stabilizing leg can be selectively rotated about the pivot connection between a raised position and a lowered position. The stabilizing leg and the two wheels combine to form a tripod support for the frame when the stabilizing leg is in its lowered position. The beach cart can therefore be made highly stable when unattended.

The beach cart has features for holding buckets and tackle boxes. The beach cart also has a cutting board and a flashlight for the convenience of a fisherman.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention beach cart can be used to carry a wide variety of objects over a variety of different terrains, it is particularly useful in carrying fishing equipment to and from the waterfront of a sandy beach. Accordingly, in the exemplary embodiment of the present invention beach cart, the cart is illustrated and described with reference to fishing equipment, such as poles, tackle boxes and the like in order to show how the various components of the beach cart function and to set forth the best mode contemplated for the invention.

Figure 1:
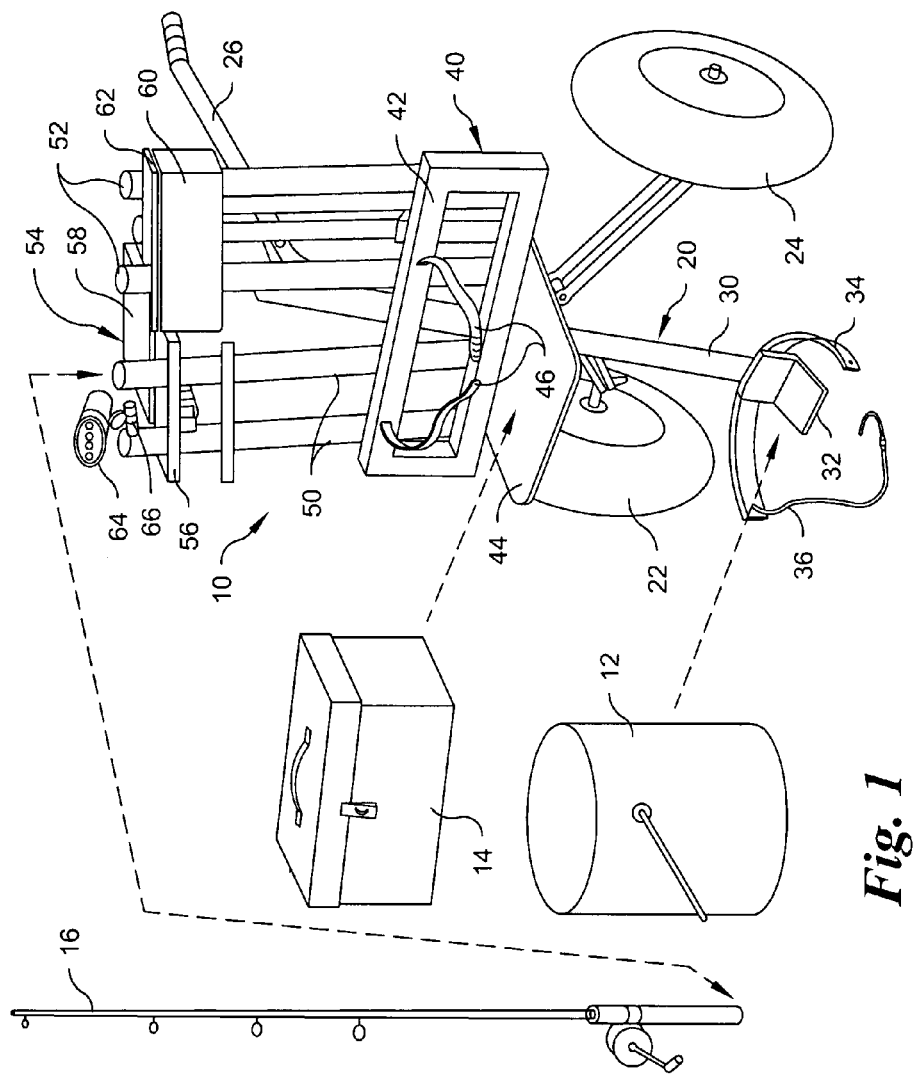
FIG. 1 is a perspective view of an exemplary embodiment of the present invention beach cart shown in conjunction with equipment commonly carried by the beach cart.

Referring to FIG. 1, an exemplary beach cart 10 is shown. The beach cart 10 is designed to hold most of the fishing equipment that is commonly carried to the beach by a leisure fisherman. This equipment includes, but is not limited to, a bucket 12 for holding fish and bait, a tackle box 14 and at least one fishing pole 16.

The beach cart 10 has a collapsible frame 20 that is selectively changeable between a compact collapsed orientation and a wider open orientation. The details of how the collapsible frame 20 changes between its closed orientation and its open orientation are later described.

In FIG. 1, the collapsible frame 20 of the beach cart 10 is shown in its open orientation. The beach cart 10 has two large wheels 22, 24 that support the collapsible frame 20. The large wheels 22, 24 allow the beach cart 10 to be easily pulled over sand and loose stones of many beachfronts. When in this open orientation, the wheels 22, 24 are both widely spaced and linearly aligned, thereby providing a broad rolling base for the collapsible frame 20.

A handle 26 extends from the collapsible frame 20 of the beach cart 10. The handle 26 extends forward of the beach cart 10 so as to be easily grasped. When a fisherman holds the handle 26, the entire beach cart 10 can be tilted so that its weight is borne by the large wheels 22, 24. The beach cart 10 can then be easily pushed or pulled.

Figure 2:
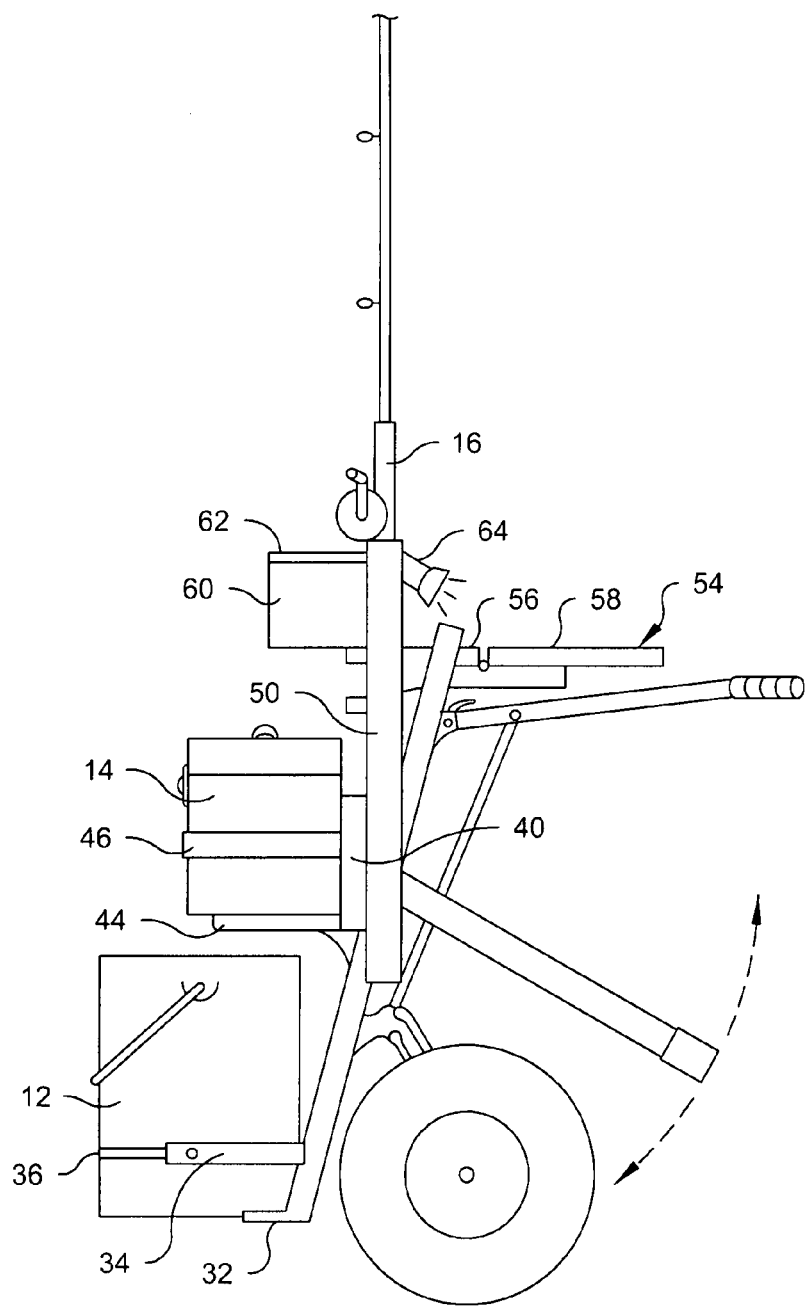
FIG. 2 is a side view of the embodiment of FIG. 1.

From FIG. 1, it can be seen that a bucket 12, tackle box 14 and fishing pole 16 can be readily attached to the beach cart 10. Referring now to FIG. 2 in conjunction with FIG. 1, it can be seen that the collapsible frame 20 of the beach cart 10 has a central shaft 30. A small protruding shelf 32 is formed at the bottom end of the central shaft 30. The bucket 12 is placed upon this protruding shelf 32. A semicircular bracket 34 extends out from central shaft 30 and passes around part of the exterior of the bucket 12. A strap 36, in the form of a belt or an elastic cord is then stretched around the bucket 12 from one end of the semicircular bracket 34 to the other in order to retain the bucket 12 in place upon the protruding shelf 32.

The collapsible frame 20 includes a lateral structure 40 that is attached to the central shaft 30. The lateral structure 40 has lateral frame elements 42 that attach to the central shaft 30 at a perpendicular to the central shaft 30. A larger shelf 44 extends forward from the lateral structure 40. Accordingly, the lateral structure 40 serves as a backstop to the shelf 44. The shelf 44 is sized to hold a tackle box 14 or small cooler of an equivalent size. A binding strap 46 extends above the shelf 44 from one part of the lateral structure 40 to another. The binding strap 46 can be a static strap with a tightening mechanism or an elastic strap. In this manner, the binding strap 46 can be used to retain a tackle box 14 on the shelf 44.

A plurality of tubes 50 are attached to the back of the lateral structure 40. The tubes 50 are held in a generally vertical orientation. The tubes 50 have open top ends 52 that are large enough to receive the handle sections of fishing poles 16. A cutting board assembly 54 is attached to at least one of the tubes 50. The cutting board assembly 54 has a base 56 that attaches to at least one of the tubes 50. The cutting board assembly 54 also includes a folding cutting platform 58 that is hinged to the base 56. The cutting board platform 58 can be selectively positioned in an extended horizontal position or a folded vertical position. The cutting board platform 58 is used to cut bait and clean fish. The cutting board platform 58 may also be marked with measurement rulings so that the cutting board platform 58 can be used as a measurement board for fish.

A container 60 is also anchored to at least one of the tubes 50. The container 60 has a lid 62 that can be open and closed. The container 60 is used to hold small objects, such as scissors, that may often be used while fishing.

A flashlight 64 can also be selectively mounted to one of the tubes 50. The flashlight 64 is preferably mounted with a pivot joint 66 above the cutting board assembly 54. In this manner, the flashlight 64 can be positioned to either illuminate the cutting board assembly 54, or the flashlight can be turned to face forward and illuminate the area in front of the beach cart 10.

Figure 3:
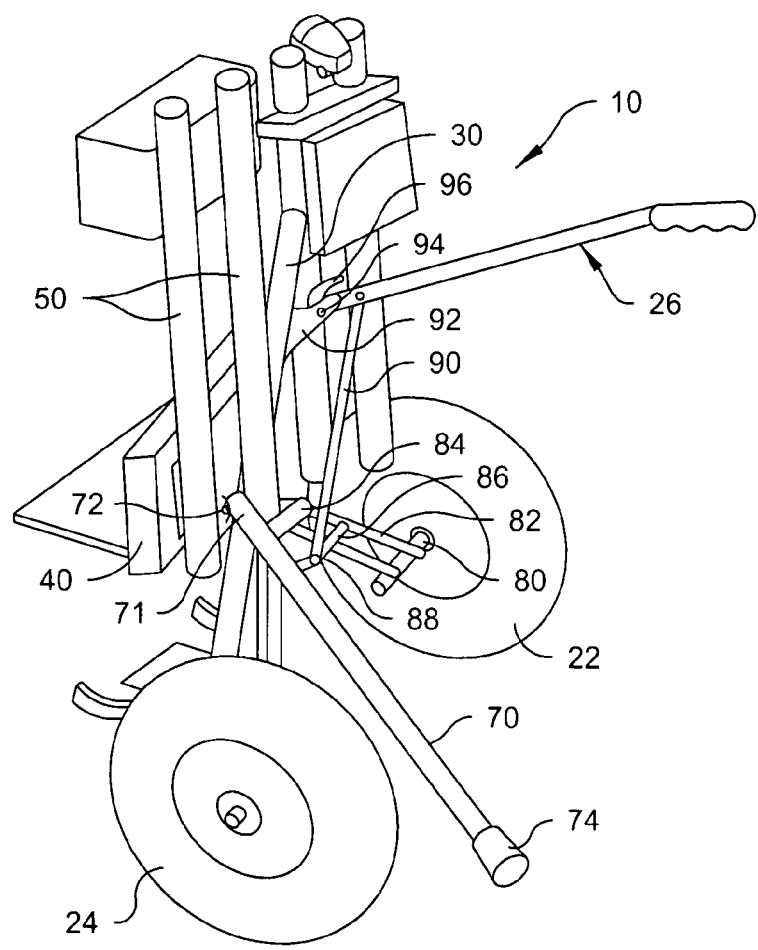
FIG. 3 is a rear perspective view of the embodiment of FIG. 1 shown in an open condition.

Referring to FIG. 3, it can be seen that a stabilizing leg 70 is present on the back of the beach cart 10. The stabilizing leg 70 has a first end 71 that is connected to the lateral structure 40 with a pivot connection 72. This enables the stabilizing leg 70 to be selectively moved between a raised position and a lowered position. When the stabilizing leg 70 is in the raised position, the stabilizing leg 70 extends between tubes 50 and lays generally parallel to those tubes 50. When the stabilizing leg 70 is in a lowered position, as is shown, the second end 74 of the stabilizing leg 70 touches the ground, if the beach cart 10 is tipped slightly toward the stabilizing leg 70. The stabilizing leg 70 and the two large wheels 22, 24 of the beach cart 10 therefore create a tripod support for the beach cart 10 that is highly stable. Consequently, when the stabilizing leg 70 is lowered and the beach cart 10 is tilted toward the stabilizing leg 70, the beach cart 10 becomes very difficult to tip. The beach cart 10 can therefore be used to hold fishing rods during fishing without having the beach cart 10 tip should a fish pull on a line. The contact of the stabilizing leg 70 on the ground prevents the beach cart 10 from rolling freely should it be pulled by a fish or blown by the wind. However, a fisherman can easily move the fishing cart 10 by merely lifting the handle 26 to a point where the stabilizing leg 70 no longer contacts the ground. When the beach cart 10 is tilted away from the stabilizing leg 70, the full weight of the beach cart 10 and its load is borne by the two large wheels 22, 24. The beach cart 10 can therefore be readily rolled by a fisherman. However, as soon as a fisherman again tilts the beach cart 10 so that the stabilizing leg 70 contacts the ground, the weight of the beach cart 10 and its load is partially taken by the stabilizing leg 70. This weight biases the stabilizing leg 70 against the ground and anchors the beach cart 10 in place.

When the beach cart 10 is being used, the large wheels 22, 24 and the stabilizing leg 70 make a wide tripod stand that is very stable. However, such a wide tripod configuration would not readily fit into the trunk of most automobiles. The present invention beach cart 10, therefore, has the ability to be collapsed into a much smaller configuration that enables the beach cart 10 to be more easily stored when not in use.

From FIG. 3, it can be seen that each of the large wheels 22, 24 has an independent axle 80 that is attached to a set of parallel linkages 82. The parallel linkages 82 attach to a joint plate 84 along the central shaft 30. A locking linkage 86 extends laterally between the sets of parallel linkages 82. The locking linkage 86 has a hinge 88 at its mid-point. One end of a push rod 90 is also attached to the locking linkage 86 near its mid-point. The push rod 90 extends upward from the locking linkage 86 and intersects the handle 26.

A short bracket 92 extends rearward from the central shaft 30. The handle 26 extends from the end of the short bracket 92 at a pivot connection 94. A mechanical locking mechanism 96 is present at the pivot connection 94 that can be used to lock the handle 26 in its shown extended position. When the mechanical locking mechanism 96 is opened, the handle 26 is allowed to rotate downwardly about the pivot connection 94 until the handle 26 lays parallel to the central shaft 30.

Figure 4:
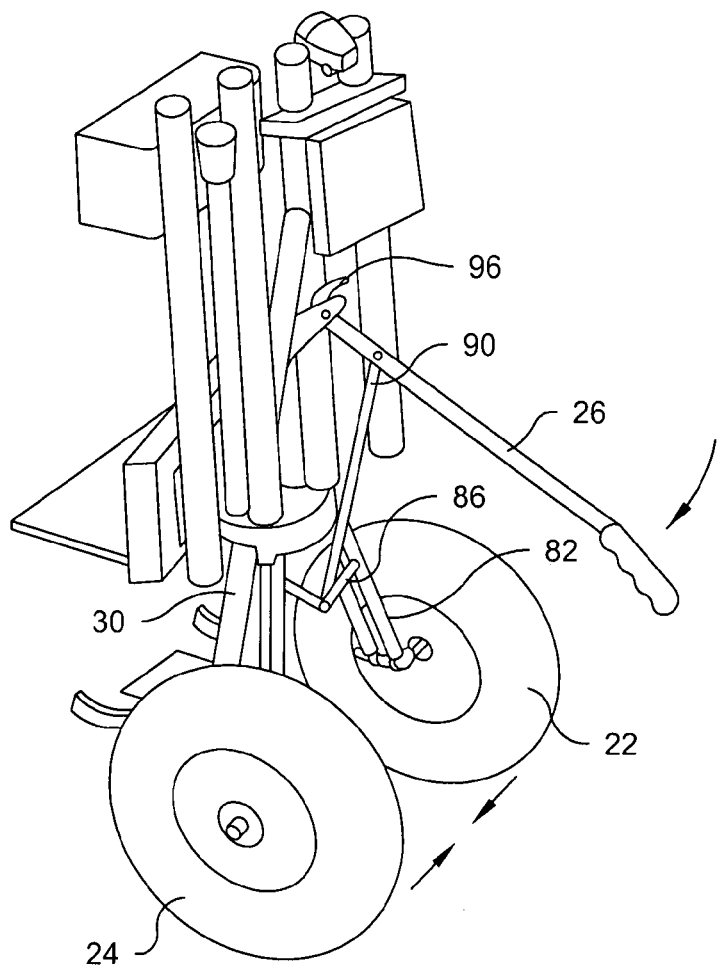
FIG. 4 is a rear perspective view of the embodiment of FIG. 1 shown in a partially collapsed condition.

Referring to FIG. 4, it can be seen that when the mechanical locking mechanism 96 is released and the handle 26 is rotated downwardly, the handle 26 pushes the push rod 90 down. The push rod 90, in turn, pushes down the hinge 88 in the center of the locking linkage 86 and collapses the locking linkage 86. As the locking linkage 86 collapses, both sets of parallel linkages 82 are caused to rotate toward each other. As a result, the wheels 22, 24 move toward each other and the entire beach cart 10 becomes far more compact. Furthermore, the handle 26 folds down against the central shaft 30 and further reduces the bulk of the beach cart 10. In FIG. 4, the beach cart 10 is shown mostly in its collapsed configuration. In such a configuration, the beach cart 10 is compact enough to be easily placed into the trunk or backseat of most automobiles.

In use, a fisherman would place the beach cart 10 in his/her vehicle and drive it as close to the beach as is permitted. The beach cart 10 is then removed from the fisherman's vehicle and is opened into its full extended configuration. To do this, a fisherman need only pull upwardly on the handle 26. As the handle 26 is raised, it pulls upon the push rod 90 that moves the locking linkage 86 and spreads the wheels 22, 24 to their widest configuration. The changing of the beach cart 10 between its open configuration and its collapsed configuration does not change the holding features of the beach cart 10. The beach cart 10 can therefore be loaded with a bucket and a tackle box, as is shown in FIG. 1. In this way, the beach cart 10 can be altered between its open configuration and its collapsed configuration without having to unload the beach cart 10 of its cargo. The beach cart 10 can therefore be fully loaded at a fisherman's home, folded into its collapsed configuration, transported to a beach and reopened to its open configuration while still carrying the same cargo.

It will be understood that the embodiment of the present invention that is described and illustrated is merely exemplary and that a person skilled in the art can make many variations to the shown embodiment using functionally equivalent components. For instance, the number of fishing pole tubes, the size of the beach cart and many elements of the frame are a matter of deign choice and can be altered to the whims of a manufacturer. All such variations, modifications and alternate embodiments are intended to be included within the scope of the present invention as defined by the appended claims.

What is claimed is:

1. A beach cart for carrying equipment along a beach, said beach cart comprising:
   a frame that is selectively positionable between a collapsed configuration and an open configuration;
   two wheels that support said frame wherein said two wheels are disposed a wide distance apart when said frame is in said open configuration and said two wheels are positioned close together when said frame is in said collapsed configuration;
   at least one fishing pole tube coupled to said frame;
   a stabilizing leg having a first end that is coupled to said frame at a pivot connection, wherein said stabilizing leg can be selectively rotated about said pivot connection between a raised position and a lowered position, wherein said stabilizing leg and said two wheels combine to form a tripod support for said frame when said stabilizing leg is in said lowered position and
   a handle that extends from said frame, said handle being selectively movable into a stowed position;
   wherein said frame includes collapsible linkages that support said two wheels, and wherein said handle is attached to said collapsible linkages and moves said collapsible linkages when said handle is moved into said stowed position, thereby causing said frame to change from said open configuration to said closed configuration.

2. The beach cart according to claim 1, wherein said beach cart has a first platform that is sized to hold a bucket, wherein said first platform is capable of retaining a bucket, without change, as said frame is moved between said open configuration and said closed configuration.

3. The beach cart according to claim 2, wherein said beach cart has a second platform that is sized to hold a tackle box, wherein said second platform is capable of retaining a tackle box, without change, as said frame is moved between said open configuration and said closed configuration.

4. The beach cart according to claim 1, further including a plurality of fishing pole tubes.

5. The beach cart according to claim 4, further including a cutting board that is affixed to at least one of said plurality of fishing pole tubes.

6. The beach cart according to claim 5, further including a flashlight mounted to at least one of said plurality of fishing pole tubes.

7. The beach cart according to claim 6, wherein said flashlight is positioned adjacent to said cutting board so as to illuminate said cutting board.

8. A beach cart for carrying fishing equipment along a beach, said beach cart comprising:
   a frame;
   at least one fishing pole tube coupled to said frame;
   two wheels;
   wheel support assemblies having a first ends that are pivotably connected to said frame and second ends that are attached to said wheels;
   a linkage disposed between said wheel support assemblies that is positionable between open condition and a folded condition, wherein said linkage spreads said second ends of said wheel support assemblies apart to a first distance when said linkage is in said open condition, and wherein said linkage draws said second ends of said wheel support assemblies toward each other to a closer second distance when said linkage is in said folded condition; and
   a handle for pulling said beach cart, wherein said handle is selectively positionable between a stowed position and an extended position, and wherein said handle is attached to said linkage and moves said linkage into said folded condition when said handle is moved into said stowed position.

9. The beach cart according to claim 8, further including a stabilizing leg having one end that is coupled to said frame at a pivot connection wherein said stabilizing leg can be selectively rotated about said pivot connection between a raised position and a lowered position, wherein said stabilizing leg and said two wheels combine to form a tripod support for said frame when said stabilizing leg is in said lowered position.

10. The beach cart according to claim 8, further including a first platform extending from said frame that is sized to hold a bucket.

11. The beach cart according to claim 10, further including a second platform extending from said frame that is sized to hold a tackle box.

12. The beach cart according to claim 8, further including a cutting board that is affixed to said at least one fishing pole tube.

13. The beach cart according to claim 12, further including a flashlight mounted to said at least one fishing pole tubes.

14. The beach cart according to claim 13, wherein said flashlight is positioned adjacent to said cutting board so as to illuminate said cutting board.

* * * * *